United States Patent Office 2,739,974
Patented Mar. 27, 1956

2,739,974

PROCESS OF PREPARING Δ⁴,⁶-3-KETOSTEROIDS

Frank B. Colton, Chicago, Ill., assignor, by mesne assignments, to G. D. Searle & Co., Skokie, Ill., a corporation of Delaware No Drawing. Application April 6, 1953,
Serial No. 347,171

4 Claims. (Cl. 260—397.3)

The present invention relates to a new method of dehydrogenation of steroids and, specifically, to a process of preparing Δ⁴,⁶-3-ketosteroids by treatment of a monounsaturated steroid containing an oxygen attached to carbon-3 with manganese dioxide. This process of dehydrogenation can be represented structurally as follows:

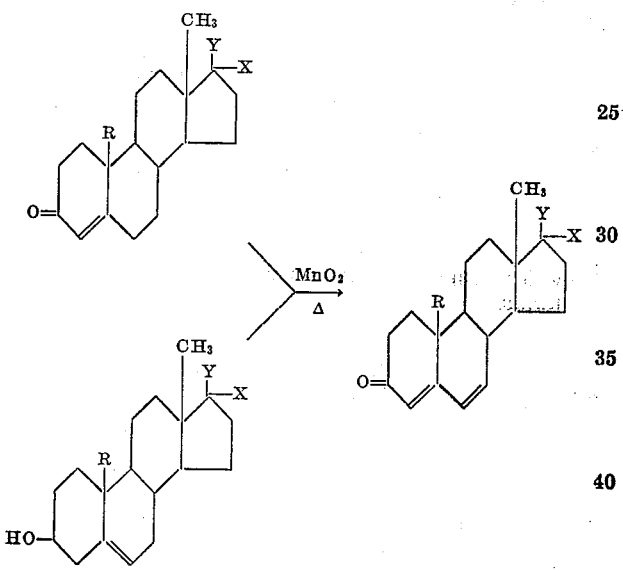

In these formulae, R represents a member of the class consisting of hydrogen and methyl, X is a member of the class consisting of hydrogen, hydroxyl, lower alkoxy and (lower alkyl)-COO-radicals and Y is a member of the class consisting of hydrogen, acetyl, glycolyl, dihydroxyethyl and lower alkyl radicals.

Among the compounds which are useful as starting materials in the above process are such monounsaturated steroids as testosterone, 19-nortestosterone, 17-methyltestosterone, 17-ethyltestosterone, Δ⁵-androstene-3,17-diol, 17-hydroxy-21-desoxy-corticosterone, 17,20,21-trihydroxy-Δ⁴-pregnene-3-one, progesterone, as well as the 17- and 21-ethers and esters thereof, such as the methyl ethers, ethyl ethers, benzyl ethers, acetates, propionates, benzoates and the like. It is a special advantage of my invention that the oxygenated functions in the radicals X and Y are not affected by this process.

This dehydrogenation process is carried out by heating the monounsaturated steroidal starting material with a large excess of reprecipitated manganese dioxide at a temperature of about 55–150° C. in an organic solvent, filtering and concentration of the filtrate to obtain the Δ⁴,⁶-ketosteroid. A great variety of organic solvents is suitable for this process, so long as the boiling point is not substantially below 50° C. The reaction is conveniently carried out at the refluxing temperature of such solvents as the lower aromatic hydrocarbons such as benzene, toluene and xylene, halogenated hydrocarbons such as dichloromethane, and lower alkanones such as acetone and butanone.

The Δ⁴,⁶-diunsaturated 3-ketosteroids have valuable androgenic, progestational and adrenocorticoid properties. They are also valuable intermediates in the organic synthesis of 7-enol esters and ethers, which can be used in the synthesis of 11-hydroxysteroids by methods published in the recent literature on the synthesis of adrenocortical substances.

The examples below illustrate in detail the procedure used in the practice of this invention. However, the invention is not to be construed as limited thereby in spirit or in scope. It will be apparent to those skilled in the art that many modifications in methods and materials may be practiced without departing from the invention. Temperatures are given in degrees centigrade (° C.) and relative amounts of materials in parts by weight.

Example 1

A mixture of 75 parts of testosterone, 800 parts of freshly prepared manganese dioxide and 5300 parts of benzene is heated at refluxing temperature for 90 minutes, cooled and filtered. The filtrate is concentrated on the steam bath and the residue is crystallized from acetone and water and then from ether. The 17-hydroxy-Δ⁴,⁶-androstadien-3-one thus obtained melts at about 181–185° C. After crystallization from ethyl acetate the product melts at 209–211° C. Its ultraviolet absorption spectrum shows a maximum at about 285 millimicrons with a molecular extinction coefficient of 29,000. The same product is obtained when an equal amount of Δ⁵-androstene-3,17-diol is substituted for the testosterone.

Example 2

A stirred mixture of 10 parts of testosterone acetate, 80 parts of manganese dioxide and 1000 parts of toluene is heated at reflux for 4 hours and filtered. The filtrate is clarified by treatment with charcoal and then evaporated to yield an oil. A benzene solution of this oil is applied to a chromatography column containing silica gel. Elution with benzene and then with a mixture of benzene with increasing amounts of ethyl acetate yields the 17-acetoxy-Δ⁴,⁶-androstadien-3-one, melting at about 130–133° C. Repeated recrystallization from acetone and hexane raises the melting point to about 142–144° C.

Example 3

A stirred mixture of 5 parts of testosterone propionate, 100 parts of manganese dioxide and 600 parts of toluene is heated at reflux for 150 minutes, cooled and filtered. Upon evaporation of the solvent the 17-propionoxy-Δ⁴,⁶-androstadien-3-one is obtained as an oil. Chromatography as in the preceding example and recrystallization from benzene yields crystals melting at about 130–133° C.

Example 4

A stirred mixture of 10 parts of 17-benzoyloxy-Δ⁵-androstene-3-ol, 100 parts of manganese dioxide and 1300 parts of toluene is heated at reflux for 3 hours, cooled and filtered. The filtrate is evaporated to yield the 17-benzoyloxy-Δ⁴,⁶-androstadien-3-one, which melts at about 251–252° C.

Example 5

A mixture of 15 parts of 19-nortestosterone, 150 parts of manganese dioxide and 1000 parts of benzene is refluxed for 3 hours and worked up as in Example 1 to yield 17-hydroxy-Δ⁴,⁶-estradien-3-one, which has an ultraviolet absorption maximum at 284 millimicrons with an extinction coefficient of 29,000.

Example 6

A stirred mixture of 10 parts of progesterone, 100 parts of manganese dioxide and 6000 parts of toluene is refluxed for 90 minutes and then worked up as in Example 1 to yield Δ⁴,⁶-pregnadien-3,20-dione. The same product melting at about 145–147° C. on crystallization from hexane is obtained by the identical treatment of 3-hydroxy-Δ⁵-pregnene-20-one.

Example 7

A stirred solution of 3 parts of 17-hydroxy-21-desoxy-corticosterone in 220 parts of toluene is treated with 25 parts of manganese dioxide and refluxed for 3 hours. The reaction mixture is worked up as in Example 1 to yield the 17-hydroxy-Δ⁴,⁶-pregnadien-3,20-dione. The ultraviolet absorption spectrum shows a peak at 284 millimicrons with a molecular extinction coefficient of about 29,000.

Example 8

A solution of 10 parts of 17-ethyltestosterone in 600 parts of butanone is stirred with 80 parts of manganese dioxide and refluxed for 2 hours. Workup as in Example 1 yields 17 - ethyl - 17 - hydroxy-Δ⁴,⁶-androstadien-3-one, which has an ultraviolet absorption maximum at 285 millimicrons.

Example 9

A solution of 20 parts of desoxycorticosterone acetate in 2500 parts of benzene is stirred and refluxed with 150 parts of manganese dioxide for 90 minutes. Workup by the procedure of Example 2 and crystallization from an acetone-hexane mixture yields 21-acetoxy-Δ⁴,⁶-pregnadien-3,20-dione melting at about 115–117° C.

I claim:

1. The process of preparing a Δ⁴,⁶-3-ketosteroid of the structural formula

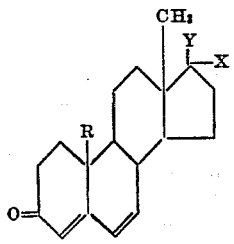

wherein R is a member of the class consisting of hydrogen and methyl radicals, X is a member of the class consisting of hydrogen, hydroxyl, benzoyloxy and (lower alkyl)-COO-radicals and Y is a member of the class consisting of hydrogen, lower alkyl radicals containing no more than 2 carbon atoms, acetyl, glycolyl and dihydroxyethyl radicals, which comprises heating with manganese dioxide in an organic solvent a compound of the structural formula

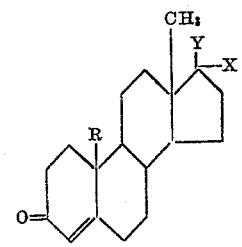

2. The process of preparing 17-hydroxy-Δ⁴,⁶-androstadien-3-one which comprises heating testosterone in an organic solvent with manganese dioxide.

3. The process of preparing Δ⁴,⁶-pregnadien-3,20-dione which comprises heating progesterone in an organic solvent with manganese dioxide.

4. The process of preparing a compound of the structural formula

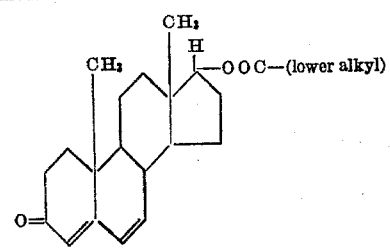

which comprises heating a compound of the structural formula

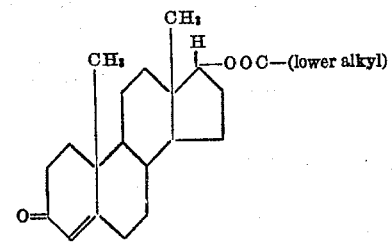

in an organic solvent with manganese dioxide.

No references cited.